Figure 1:
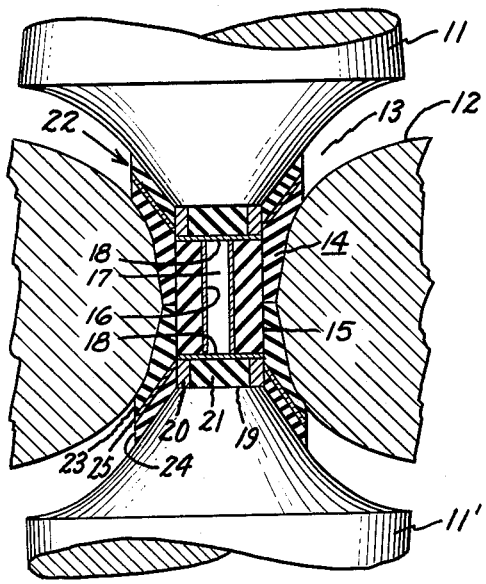

Feb. 8, 1966  R. H. WENTORF, JR., ET AL  3,233,988
CUBIC BORON NITRIDE COMPACT AND METHOD FOR ITS PRODUCTION
Filed May 19, 1964

Inventors:
Robert H. Wentorf Jr.,
Anthony J. De Lai,
by Leo J. MaLossi
Their Attorney.

3,233,988
CUBIC BORON NITRIDE COMPACT AND METHOD FOR ITS PRODUCTION

Robert H. Wentorf, Jr., Schenectady, N.Y., and Anthony J. De Lai, Reading, Mass., assignors to General Electric Company, a corporation of New York
Filed May 19, 1964, Ser. No. 368,522
5 Claims. (Cl. 51—307)

This application is a continuation-in-part of application Serial No. 60,011, Wentorf, Jr., et al. (now abandoned) filed October 3, 1960, and assigned to the assignee of this invention.

This invention relates to the unification of individual crystals of the cubic form of boron nitride into a coherent conglomerate mass and more particularly to the provision of a tough, high strength compact, or compact abrasive, suitable for use as the abrading medium in various cutting and grinding elements, which compact possesses a very long shelf life.

Crystals of the cubic form of boron nitride are hereafter referred to as "borazon" and are prepared by subjecting a hexagonal form of boron nitride to high pressures and high temperatures of about at least 1200° C. and 50,000 atmospheres respectively in combination with a catalyst material. One suitable apparatus for carrying out the combined high temperature, high pressure conditions is disclosed and claimed in U.S. Patent 2,941,248, Hall, which is included by reference herewith, and a method of preparing borazon is disclosed and claimed in U.S. Patent 2,947,617, Wentorf, which is also included by reference herewith.

While borazon has been found to be useful in cutting and grinding operations generally because its hardness is similar to that of diamond and it is more temperature resistant, bonding problems are generally similar to those problems of bonding diamond. Thus, it is just as difficult to bond a borazon crystal to another borazon crystal as it is to bond diamond-to-diamond. This fact becomes of particular significance because of the fact that in the preparation of borazon as described in the aforementioned U.S. Patent 2,947,617, in addition to making larger crystals having varied industrial uses, many borazon crystals of very small size are produced. The small particles of borazon are of limited use and it is generally recognized that the commercial value of these particles can be substantially increased by joining a large number of the smaller particles together into a conglomerate mass of sufficient size, toughness, hardness, cohesiveness and stability for incorporation into a commercially practical tool.

A borazon compact, or compact abrasive, may be defined as a cluster of borazon crystals bonded together in self-bonded relationship, by means of some bonding medium disposed between the crystals or by some combination of the aforementioned bonding mechanisms. The structural integrity of the cluster of borazon crystals so bonded together must enable utilization of the compact to abrade substances having, or containing matter having, a hardness of at least 7 on the Mohs' scale of hardness. Such a compact is composed of borazon particles arranged in random orientation, and as a result, any cleavage of the compact will not occur on a single cleavage plane, as would be the case with a single crystal, but must follow a tortuous course dictated by the cleavage directions of the individually randomly oriented particles. Obviously a higher stress is required to cause this type of cleavage in a borazon compact. Also, the random disposition of these small particles provides a cutting surface that is self-sharpening.

As is true in the case of the diamond compact, a superior borazon compact results when the compact preparation is accomplished using a minimum content of bonding medium. If, for example, the individual borazon crystals can be arranged in crystal-to-crystal contact with adjacent crystals, each individual borazon crystal will have greater resistance to being dislodged from the mass, because of this lateral support, and less reliance need be placed upon the adhesive capacity of the bonding medium.

Accordingly, it is an object of this invention to provide a borazon compact.

It is another object of this invention to bond borazon crystals to borazon crystals.

It is another object of this invention to provide a borazon compact tool.

It is another object of this invention to provide a borazon compact with a minimum of bonding medium.

It is a further object of this invention to provide a tough, coherent, high strength borazon compact in which additional materials may be introduced to provide different characteristics.

Briefly described, this invention includes, in one preferred form, subjecting a plurality of clean individual borazon crystals in small particle or powder form to very high pressures and temperatures either when alone or when accompanied by small quantities of specific materials whereby the crystals are bonded together to form a tough, coherent, high strength, stable compact abrasive body.

Figure 2:
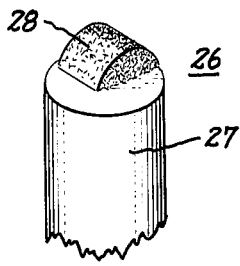

This invention will be better understood when taken in connection with the following description and the drawing in which:

FIG. 1 is a partial sectional view of one preferred form of high pressure, high temperature apparatus; and FIG. 2 is an illustration of a borazon compact tool.

Referring now to FIG. 1, there is illustrated the essential parts of a high temperature high pressure apparatus constructed in accordance with the above mentioned Hall patent. Apparatus 10 includes a pair of punches 11 and 11' of a hard material, for example, cemented tungsten carbide, and an intermediate belt or die 12 of the same material. Each punch is surrounded by a plurality of press-fitted binding rings (not shown) which increase the strength of the punches, and a soft steel outer ring (not shown). Die 12 also has binding rings and a soft steel safety ring thereabout (also not shown). Die member 12 includes an aperture 13 in which there is positioned a reaction vessel 14.

Reaction vessel 14 in one preferred form includes a hollow electrically nonconducting stone-like cylinder 15 having concentrically positioned therein an electrically conductive tube 16. Tube 16 contains the specimen material 17 to be subjected to high pressures and high temperatures. Adjacent both ends of the tube 16 and cylinder 15 is an electrically conductive disc 18, and positioned concentrically on each disc 18 is an end cap 19. Each end cap includes an electrically conductive metal ring 20 encircling an electrically nonconductive stone-like disc 21. Each punch 11 and 11' and die 12 includes a gasket assembly 22 therebetween. Gasket assembly 22 generally comprises a pair of thermally insulating and electrically nonconducting gaskets 23 and 24 and an intermediate metallic gasket 25. Suitable examples of materials from which these gaskets and cylinder 15 may be made are various stones, ceramics, etc., for example, catlinite, pyrophyllite, talc, etc.

Motion of one or both punches 11 and 11' compresses the gasket assemblies 22 and the reaction vessel 14 to subject the specimen in tube 16 to high pressure. At the same time, electrical current is provided from a source not shown to flow through punch assembly 11 and 11' and through the specimen and/or tube 16 to raise the temperature of the specimen by electrical resistance heating.

The foregoing description relates merely to one high pressure high temperature apparatus. Various other apparatuses are capable of providing the required pressure and temperatures that may be employed in the scope of this invention. Pressures in such a high pressure apparatus are generally determined by the use of a standard of known electrical resistance changes of certain metals, for example, cesium, barium, thallium, and bismuth at known pressures, such as given by P. W. Bridgman, "Proceedings of the American Academy of Arts and Sciences," vol. 81, IV, pages 165–251, March, 1952. Temperatures are determined by thermocouple elements within the reaction volume and by extrapolation beyond the working ranges of thermocouples. Reference is made in this respect to the aforementioned Hall Patent 2,941,248 and to Hall et al. Patent 2,947,610 relating to a process of growing diamonds from carbonaceous material. Each patent more particularly describes operation and measurements of pressure and temperatures as employed in the present invention.

One example of the process employed to produce borazon in the apparatus of FIG. 1 is to utilize a container, tube 16, of carbon having an outside diameter of about .125 inch and a wall thickness of about .020 inch, and .450 inch in length. This tube 16 is filled with a mixture of about 3 parts by volume of hexagonal boron nitride powder and 1 part by volume of magnesium lumps. The sample is then subjected to pressures in the range of from about 69,000 to about 95,000 atmospheres and temperatures of about 1300° C. to 1900° C. for about 3 minutes. Ordinarily, the magnesium acts as a catalyst. Other catalysts include at least one of the materials selected from the class consisting of the alkali metals, alkaline earth metals, lead and antimony, tin, and nitrides of the foregoing metals.

The reaction mass containing cubic boron nitride crystals, unconverted hexagonal boron nitride material, and the reaction products of the catalytic materials is removed from the apparatus and subjected to further treatment to separate the individual crystals of cubic boron nitride from the matrix. After treatment of the reaction mass in hydrochloric acid or aqua regia, the borazon crystals may easily be separated from the balance of the material in clean condition. If necessary, the crystals may be subjected to additional acid treatment.

Thereafter, using the above-described apparatus, by filling tube 16 solely with the cleaned individual borazon crystals and subjecting these crystals to pressures and temperatures on the order of 90,000 atmospheres and 2100° C. respectively, or higher, a tough, coherent stable compact is obtained. It is believed that at these conditions borazon is the stable phase and that consolidation takes place by plastic flow of the individual grains of borazon. Thus, the usual voids found between the grains of a loose coarse powder vanish as the deformations of the adjacent particles permit them to fit snugly together on nearly all surfaces. The bonding or physical joining, which occures between particles is of such excellence that the entire compact body is transparent to a depth of about .5 mm. and the boundaries between separate grains are generally noticeable only because of the different colors of the grains.

Additionally, when the borazon crystals are placed in certain tubes of metals, such as, tantalum, and then exposed to the same high pressure high temperature conditions for a few minutes, the consolidated body assumes the shape of its container and it is, therefore, possible to form the body to desired shapes and forms.

In addition to the aforementioned first method for making compacts of cubic boron nitride, a second and a third method has been discovered. The second method is a variation of the first method (wherein solely cleaned individual borazon crystals are subjected to high temperatures and pressures) in that small amounts of certain materials are added to the borazon crystals in tube 16 and then the mixture is subjected to the aforementioned high temperatures and pressures.

The third method is recognized as inherent in the conversion of hexagonal boron nitride to cubic boron nitride by the method described in U.S. 2,947,617 when specifically employing magnesium or $Mg_3N_2$ as the catalyst and using pressures and temperatures near the upper end of the range disclosed therein, i.e., 80,000 atmospheres and 2000° C. Under these conditions conversion to borazon proceeds at a very rapid rate whereby cubic boron nitride crystals of very small size are formed growing very close together.

Although compacts of borazon crystals prepared by the first and second methods are durable and stable both in the presence of moisture and/or atmospheric air, such is not the case with respect to the clumps of borazon crystals sometimes formed during the catalytic conversion of hexagonal boron nitride to borazon. Such conglomerates of hard material, hereinafter referred to as "conversion compacts," gradually lose their strength as the result of exposure to air, water and/or acids.

Actually, in the conversion of hexagonal boron nitride to borazon by the catalytic method of U.S. 2,947,617 with any of the catalysts recited therein other than magnesium or magnesium nitride, the borazon crystals formed are never firmly stuck together in any strong bonding relationship. Although after the conversion of hexagonal boron nitride to cubic boron nitride, the crystals in the reaction mass may touch each other and remain so oriented as the reaction mass is cooled, such contact serves at best only to stick the crystals together much as individual salt crystals may become stuck to each other in damp weather. Very little force is required to separate individual crystals from such collections of borazon crystals.

In the case of tough conversion compacts produced using magnesium or magnesium nitride catalyst conversion, the initial strength of such conglomerates is diminished considerably upon exposure to air, water and/or acids as the result of deterioration of the magnesium reaction compounds, which otherwise would serve as the bonding medium for the borazon crystals. These magnesium reaction compounds are probably salts related to $Mg_3N_2$ although the exact composition(s) and crystal structure are not known. It has, however, been established that these compounds are able to function as very strong bonding mediums so long as they are kept out of contact with air, moisture or acids.

During the progress of the reaction, while these catalyst or catalyst-derived compounds are in the hot, fluid condition, they enter and occupy the inter-crystal spaces between the borazon crystals being formed during the catalytic conversion. In effect, deposits of the magnesium reaction compounds, probably existing as thin films, are disposed between adjacent crystals of borazon and remain so located as the crystals cool. These deposits of magnesium reaction compounds in the conversion compacts separate adjacent crystals and serve as the sole bonding mechanism therefor, because direct contacts between cubic boron nitride crystals resulting during the conversion are few and of little consequence to the structural integrity of the conversion compacts.

A measure of the strength of these magnesium reaction compounds as bonding mechanisms is based upon the fact that when conversion compacts are first removed from the pressure vessel, the crystals of cubic boron nitride therein are held together so firmly that such compacts easily abrade hard steel without individual crystals being torn from the conglomerate mas. However, tests have shown that this unusual structural integrity evident in newly formed conversion compacts is short-lived.

Tests were conducted in order to evaluate the comparative stability of conversion compacts and borazon compacts prepared with preformed borazon crystals. A number of compacts were prepared from preformed borazon crystals by the above-described first and second methods and several conversion compacts were made using the aforementioned conditions for rapid crystal growth together with magnesium catalyst materials (magnesium metal or $Mg_3N_2$). At least one of each type of compact was exposed to approximately the same environmental conditions for about the same period of time and was then subjected to a drop-weight test in order to determine the strength of the compact after the particular treatment. In the drop-weight test, a 0.10 pound weight is allowed to fall from a measured height and strike the upper end of a hardened steel pin. The impact of the weight on the steel pin applies a compressive shock to the compact being tested, such compact being disposed between the hardened steel pin and a steel anvil. As a basis for comparison it has been found that a single crystal of industrial diamond when exposed to the drop-weight test is generally found to have a strength of about 0.8 inch-lb., that is, the crystal will usually survive the first impact when the 010 lb. weight falls 8 inches to strike the pin.

Freshly formed compacts, whether prepared from preformed cubic boron nitride crystals alone, preformed cubic boron nitride crystals to which a small amount of material has been added, or as conversion compacts, exhibit strengths of about 0.8 inch-lb. in the drop-weight test. Thus, when newly formed, there appears to be no significant difference in the strength of the various compacts.

A conversion compact was exposed to boiling dilute HCl for a few hours and then tested. Such treatment produces an effect upon the compact so severe that after this exposure the conglomerate was too weak to be tested by the drop-weight test. The compact so treated appeared to have the strength of soft chalk. The drastic reduction in strength is due to the leaching out of the mass of the magnesium reaction compounds responsible for bonding together the borazon crystals.

The effect of water on compact strength was determined by submerging a conversion compact in water at 25° C. After 10 days, the surface layers of this compact were determined, by visual examination and probing with a steel needle, to have softened to the extent that the surface could be abraded with the needle. When this exposure was extended for 36 days the surface degeneration proceeded deeper into the compact until after the 36-day period the thickness of the softer altered skin was determined to be about 0.15 mm. Below the softened exterior layer the alteration of the compact structure was less pronounced, because the interior of the compact remains well shielded (by the close-packed orientation of the crystals and the reaction products of the mass with water) from rapid penetration by water. When tested, the water-treated conversion compact was found to have diminished in strength to a value of from about 0.2 to 0.4 inch-lb. in the drop-weight test.

Still another conversion compact was exposed to ordinary room air at 25° C. and about 40% relative humidity for a period of 36 days. When examined at this time, it was noted that some slight deterioration had occurred in the surface layers of the conversion compact, because portions of the surface could be abraded or crushed by manually scraping a steel needle thereover. This conversion compact was found to have the strength of about 0.4 inch-lb. in the drop-weight test after the exposure.

In contrast thereto, compacts formed from preformed borazon crystals, whether by the use of borazon crystals alone or in combination with small amounts of additive materials, displayed no measurable deterioration in strength as measured by the drop-weight test and as indicated by examination thereof after nearly 5 years' exposure to room air at 25° C., after 21 days submersion in water at 25° C. or after exposure to boiling dilute HCl for a few hours.

It has also been found that conversion compacts exposed for as little as 6 months in room air at 25° C. and at relative humidity ranging between about 40% and 80% lose their strength and become soft and crumbly, somewhat like chalk.

By these observations and tests, it has been established that conversion compacts cannot be considered stable in room air or in the presence of moisture, because of the destruction of the catalytic conversion products, which function as the sole bonding mechanism for the borazon crystals. Borazon compacts prepared from preformed borazon crystals (the first and second methods referred to hereinabove), however, remain stable for an indefinitely long time under similar conditions of exposure because true crystals-to-crystal bonds are produced in the manufacture of these compacts and such bonds are not effected except by actual disintegration of the cubic boron nitride crystals themselves.

The following table is exemplary of a number of specific examples carrying out the first and second methods comprising this invention. "BZN" is the abbreviation employed therein for borazon. Better results are obtained when BZN particle size smaller than about 20 mesh is employed. In the following examples mesh size of BZN ranged from 60–300 and mixtures of mesh sizes. No discernible difference in the final product was noted because of differences in mesh size of the starting BZN. Tube 16 was filled and hand tamped or packed.

SINTERING BORAZON

| Ex. No. | Tube 16 | Tube Size, I.D., O.D., Inches | Sample Matl., Percent by Weight | Est. Temp., °C. | Press. Atm.×10³ | Time, Min. | Remarks |
|---|---|---|---|---|---|---|---|
| 1 | Al₂O₃ with C sleeve | .093 / .144 | BZN, 100% | 2,200 | 90 | 2.0 | Sintered pieces of BZN were polished easily, unaffected by HF and HNO₃. *Hex. BN present at hot spots in capsule. |
| 2 | C | .125 / .081 | BZN, 100% | 2,400 | 90 | 2.0 | Some hex. BN present. Flat surfaces could be polished on sintered pieces. |
| 3 | Al₂O₃ with C sleeve | .093 / .144 | BZN, 100% | 2,200 | 90 | 2.0 | Al₂O₃ melted and flowed, borazon sintered. |
| 4 | C | .125 / .081 | BZN, 100% | 2,280 | 90 | 2.0 | Borazon at center of sample very brittle; sintered, hard borazon at ends of sample. |
| 5 | C | .125 / .081 | Al₂O₃, 10%; BZN, 90% | 2,330 | 90 | 4.0 | Hex. BN at center of sample, pieces of BZN sintered at ends, difficult to polish. |
| 6 | C | .125 / .081 | Be, 10%; BZN, 90% | 2,260 | 90 | 3.0 | Hex. BN present in hottest portions of capsule; sintered BZN at ends. |
| 7 | C | .125 / .081 | Be, 8%; BZN, 92% | 2,080 | 90 | 3.0 | Hex. BN present in hottest portions of capsule. Hard, sintered BZN at ends. |
| 8 | C | .125 / .081 | Al₂O₃, 10%; BZN, 90% | 2,110 | 75 | 3.0 | Hex. BN present. Sintered hard pieces of BZN at ends. |
| 9 | C | .125 / .081 | BN, 10%; Li₃N, 10%; BZN, 80% | 2,270 | 90 | 4.0 | Sintered pieces of BZN present along with Hex. BN, polished quite smooth, some voids present. |
| 10 | C | .125 / .081 | W, 23%; BZN, 77% | 2,200 | 90 | 4.0 | Center of sample converted to Hex. BN, BZN polished similar to framesite diamond. Smooth surfaces formed with difficulty. No visible voids. |

See footnote at end of table.

SINTERING BORAZON

| Ex. No. | Tube 16 | Tube Size, I.D., O.D., Inches | Sample Matl., Percent by Weight | Est. Temp., °C. | Press. Atm.×10³ | Time, Min. | Remarks |
|---|---|---|---|---|---|---|---|
| 11 | C | .125 / .081 | W, 23.4%; BZN, 76.6% | 2,150 | 90 | 10.0 | Small quan. of Hex. BN present, sample split into hard BZN discs. |
| 12 | C | .125 / .081 | Mo, 20%; BZN, 80% | 2,200 | 90 | 3.0 | Hex. BN present, sintered BZN pieces quite tough. |
| 13 | C | .125 / .081 | Cu, 3%; Cr, 3%; BZN, 94%. | 1,800 | 90 | 5.0 | Formed good sintered material. |
| 14 | Ta | .125 / .081 | Cu, 10%; Mn, 10%; Ti, 10%; BZN, 70%. | 1,500 | 85 | 7.8 | Sintered BZN obtained. |
| 15 | Ta | .125 / .081 | Cu, 10%; Mn, 10% Ti, 10%; BZN, 70%. | 1,475 | 50 | 5 | Partially sintered. |
| 16 | Ta | .125 / .081 | Cu, 10%; Mn, 10% BZN, 80%. | 1,600 | 85 | 4 | Three sintered pieces. |

\* Hex. BN is intended to mean hexagonal boron nitride.

In accordance with the aforementioned second method for making compacts of cubic boron nitride the addition of small amounts of such materials as $Al_2O_3$, W, Cr, Mn, Co, Mo, Ti, Ni, Cu, Re, Zr, BeO, and Be did not appear to change the general characteristics of a compact but provided further good cementing and bonding means. Such additions, while not necessary, may be desirable in some applications to provide a useful bonding mechanism, as for example, between a compact and a holder, and thus may be added without injuriously affecting the intercrystalline bonding of the borazon crystals in the compact.

The compacts obtainable from the above samples may be ground and polished by the use of conventional diamond shaping techniques. The grain, or hardness anisotropy, of borazon is not as pronounced as that of diamond so that it is much easier to shape a piece of consolidated borazon than a piece of consolidated diamond. When such a compact is suitably mounted within a tool, it may be used directly as a cutting and grinding element having superior advantages over diamond compact because of its increased temperature stability and greater ease of forming to a desired shape. Such a compact is also more desirable than a single crystal because a wearing away of a compact continually exposes clean new crystals while, on the other hand, in a single crystal tool, breakage of the single crystal would render the tool useless.

Compacts of this invention have been mounted in a tool 26 generally as illustrated in FIG. 2. Referring now to FIG. 2, there is illustrated a compact 28 positioned within a suitable support member 27. Support member 27 in this instance may be considered generic to all forms of holders whether it be for a cutting or grinding tool generally, wheels, saws, etc., and other forms of tools utilized to cut various substances in which inserts may be positioned therein.

Compacts are easily mounted in a suitable tool holder because of the profuse number of projecting crystals or irregular edges which operate as gripping surfaces to securely mount the compact within a tool holder. More particularly, the compact may be bonded to a tool holder by any suitable method, such as that described in Patent 2,570,248, Kelley, which comprises bonding of cubic boron nitride to a base member through intermediate layers of solder, and titanium hydride. When this method of bonding is employed, an opening is first made in a cutting tool and the sides of the opening are coated with a layer of solder. Thereafter, a slurry of titanium hydride in a volatile organic liquid is painted on the surface of the solder. Ordinarily, the type of soldering is not critical; however, it is preferred to utilize the solder having a melting point higher than that of the decomposition temperature of titanium hydride. One suitable solder for this purpose is a mixture of silver and copper. After painting the solder surface of the slurry, a cubic boron nitride compact is placed in the opening and the entire assembly is then heated in vacuum to a temperature at which titanium hydride decomposes. Best results are obtained by the compact being firmly bonded to the tool through the titanium hydride layer and the solder layer. However, because of the profuse mass of protruding crystals in the highly irregular surface various other bonding means may be employed within the scope of this invention, particularly where the bonding medium is suitably admitted into the irregular surface of the compact to provide a good gripping surface or where the tool material itself may be caused to flow or enter into the irregularities of the surface to provide a suitable bond.

Since the successful marketing of any abrasive product of tool necessarily imposes a substantial time lag between the time of actual formation of a borazon compact and the actual use of this compact as the working element of an abrading or cutting tool by the customer, the stability of the conglomerate mass of borazon crystals is a very important aspect. Unless a given type of borazon compact exhibits a shelf life of at least several years it cannot be commercially feasible.

Accordingly, it is understood that by the practice of this invention there is provided a suitable compact of borazon crystals not requiring any particular bonding medium for the intercrystalline bonding of the individual crystals and a stable compact which is regularly usable in the general field of cutting, grinding and sawing, etc.

It is not desired that the invention be limited to the particular description or the particular configuration illustrated and it is intended by the appended claims to cover all modifications within the spirit and scope of this invention.

What we claim as new and desire to secure by Letters Patent of the United States is:

1. A tough, coherent, high strength, stable compact abrasive consisting essentially of a self-bonded heat and pressure-compacted plurality of crystals of the cubic form of boron nitride, substantially all said crystals being in crystal-to-crystal contact with adjacent crystals of cubic boron nitride.

2. A tough, coherent, high strength, stable compact abrasive consisting of a self-bonded heat and pressure-compacted plurality of crystals of the cubic form of boron nitride, substantially every crystal being oriented in crystal-to-crystal contact with adjacent crystals.

3. A tough, coherent, high strength, stable compact abrasive consisting essentially of a plurality of crystals of the cubic form of boron nitride and at least one of the bonding materials chosen from the group consisting of W, Ni, Be, Re, Ti, Zr, Cr, Co, $Al_2O_3$, BeO, Mo, Mn and Cu, said crystals of boron nitride being in crystal-to-crystal contact and being in quantity by weight equal to at least 70% of the compact.

4. A stable compact abrasive as recited in claim 3 wherein the bonding material is $Al_2O_3$.

5. A stable compact abrasive as recited in claim 3 wherein the bonding material is molybdenum.

References Cited by the Examiner

UNITED STATES PATENTS 2,947,617   8/1960   Wentorf _____ 51—307
3,141,746   7/1964   De Lai _____ 51—307

ALEXANDER H. BRODMERKEL, *Primary Examiner.*

D. J. ARNOLD, *Assistant Examiner.*